Nov. 14, 1967  W. M. HAMMOND, JR  3,352,196
SIGHTING DEVICE WHICH SUPERIMPOSES THE
IMAGE OF TARGET WITH THAT OF A MISSILE
Filed Sept. 3, 1963  2 Sheets-Sheet 1

INVENTOR.
WARDLAW M. HAMMOND, JR
BY
Michael A. Silza Jr.
ATTORNEY.

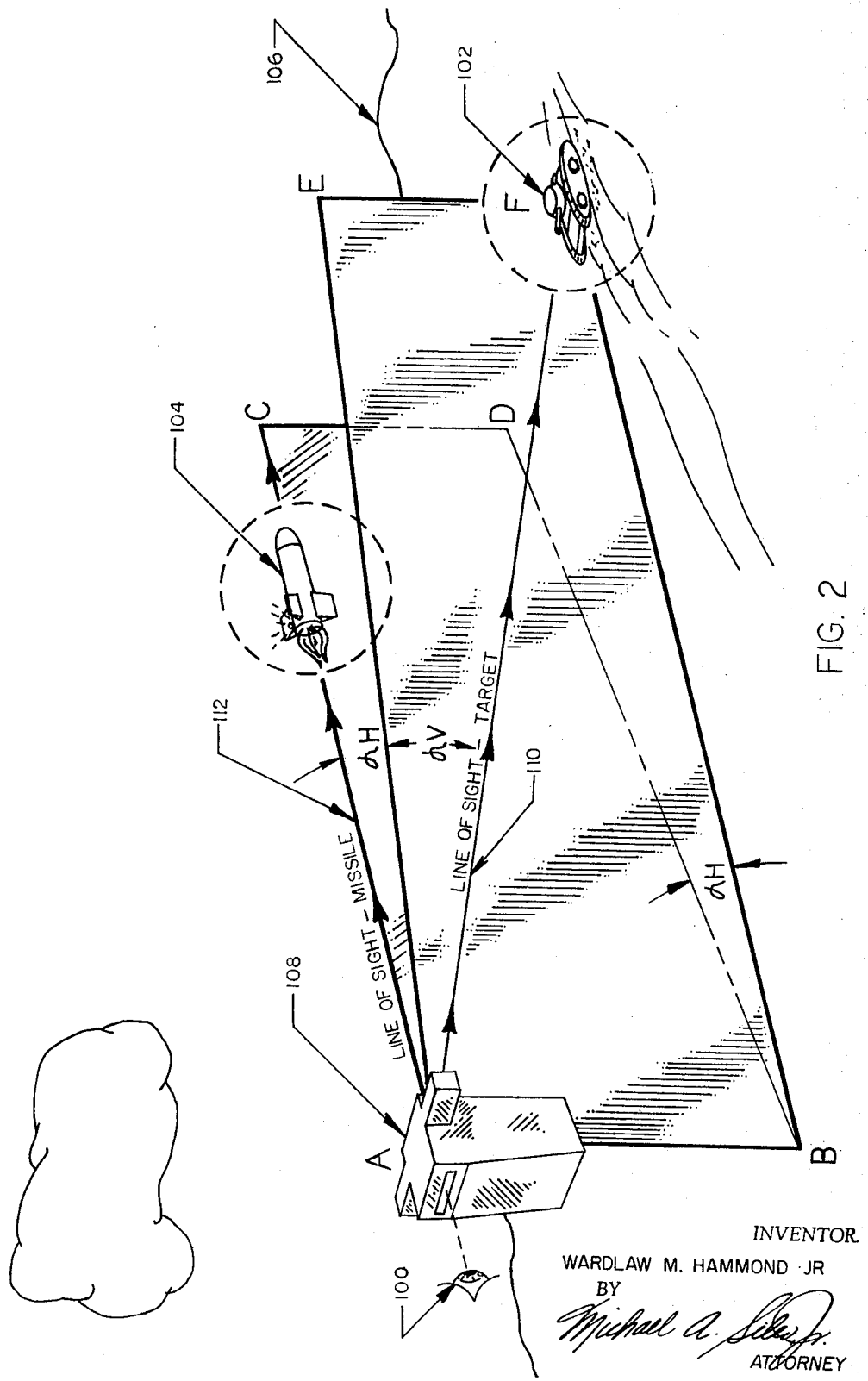

United States Patent Office 3,352,196
Patented Nov. 14, 1967

3,352,196
SIGHTING DEVICE WHICH SUPERIMPOSES THE IMAGE OF TARGET WITH THAT OF A MISSILE
Wardlaw M. Hammond, Jr., Winter Park, Fla., assignor to Martin-Marietta Corporation, Middle River, Md., a corporation of Maryland
Filed Sept. 3, 1963, Ser. No. 306,149
6 Claims. (Cl. 88—2.4)

This invention relates to a sighting device utilizing optical principles in combination with electromagnetic controls, and more particularly to a sighting device for visually observing the course of a moving remote object towards a predetermined target, which device optically processes light rays emanating from the object and target for developing respective images thereof. The relative positions of the images as viewed by an observer are electromagnetically controlled so that when the object and target are not optically aligned, the images may, in accordance with this invention, be moved into superposition to generate an error signal proportional to such movement of the images and uniquely indicative of the amount of angular deviation of the object from optical alignment with the target, which error signal may thereafter be utilized to develop a command guidance signal for the moving object.

Although the present invention may be utilized in general areas of application, such as navigation, surveying, goniometers, etc., the present disclosure exemplifies a use of this invention in the weapon guidance system of an aircraft for visually observing the flight of a guided missile launched from the aircraft, and for manually determining whether or not the missile is in an intercept course or in optical alignment with a predetermined remote target. Accordingly, the output signals developed by the sighting device of the present invention may be utilized to develop steering command signals for transmission to the missile, which signals will insert corrective commands to the guidance section of the missile so as to bring the missile "on-target" or in optical alignment with the target as viewed by the observer.

In the development of missile weapon systems, a need arose for a guidance technique wherein the observer of the missile launching vehicle could visually observe the course of the missile toward the target and accurately correct for any deviations of the missile from its intercept course to the target. The prime problem involved was the accurate and rapid determination of such deviations relative to the missile's intercept course. It was, therefore, manifest that the guidance system accurately and rapidly determined the relative positions of the missile and target so that the observer could visually determine whether or not the missile would strike the target if it continued to follow its present course. Bascially, the problem primarily involved is the accurate and rapid determination of the relative positions of two remote objects.

Another problem confronting designers of conventional angle measuring devices, such as a transit or goniometer, is the requirement that a stable alignment be maintained between the optical elements of the device and the objects being sighted so as to enable accurate determination of the angular positions of the objects. Accordingly, any movement of the device relative to the target or observer undesirably disturbs the observers line of sight to the target, as well as the stable base of the instrument, which is customarily used as the angle reference, thus making it technically difficult to accurately measure angles under non-stable alignment conditions. Attempts to maintain stable alignment require highly elaborate and costly optical base line reference techniques, and when such optical sighting devices are used in a moving vehicle elaborate gyroscopically stabilized platforms are necessary.

One prior known optical sighting technique utilizes an actuator which is similar in principle to the well known electromagnetic solenoid. That is to say, the actuator comprises inter alia, a coil mounted on a spider which is mounted in an annular magnetic field. The spider restricts the movement of the coil to considerably small translations. The magnetic field is conventionally established by a fixed magnet attached to circular pole pieces. In order to convert the coil movement from translation to rotational movement some form of a mechanical transfer mechanism is utilized. In the conventional configuration, bearings are used to support the rotating elements of the device. Although measuring devices of this type are satisfactory in some respects, they have unsatisfactory damping characteristics, and because of the necessity of incorporating bearings, they develop an undesirable frictional load upon the system and prevent precise return of the rotating mechanism to a neutral or unenergized position and thereby effect the accuracy of null measurement. In addition, since these types of measuring devices do not directly produce a rotational movement, they therefore necessitate the use of a transfer mechanism which undesirably intrdouces mechanical hysteresis into the device due to friction and bearing clearances, and are bulky, costly and require high tolerance manufacturing techniques. It is generally recognized that measuring devices of this type are inapplicable where exceedingly precise angular measurements are required and where the device would be subjected to excessive vibration during operation.

Other optical measuring instruments using moving mirrors, such as are found in a mirror galvanometer or a mirror type oscillograph, have limitations as to the degree of angular accuracy of mirror movement which can be achieved. These types of measuring devices generally incorporate the well known D'Arsonval movement which requires bearings in order to center a bobbin of wire in a magnetic field, and undesirably necessitates the use of a relatively large permanent magnet and cooperating pole pieces. Additionally devices of this type have inherently poor damping characteristics. D'Arsonval movements are unsatisfactory as actuators for use in a highly accurate angle measuring device in that they are poorly damped and require the use of bearings which inherently introduce high friction losses. Devices of this type are also bulky, costly and necessitate high tolerance manufacturing techniques. In addition, the D'Arsonval type measuring device is not capable of developing a large torque relative to its size by virture of the fact that the considerably small moving coil which causes mirror movement cannot carry heavy currents.

There is, therefore, a grave need in the missile and weapon guidance art for a sighting device capable of rapidly and accurately determining the amount of deviation of two remote objects from predetermined relative positions; which device directly produces rotating movement of the optic sections; does not require the use of bearings; develops a low friction load upon the device; has high damping characteristics; develops high torque for its size; is light in weight; has low tolerance requirements; and does not require an optical base line reference fixed relative to the remote objects.

The instant invention may be compared in broad principle to a form of the well known sextant, and principles similar in operation to those utilized in a sextant are incorporated. However, unlike the sextant, the present invention uniquely permits visual observance of a moving object relative to a stationary target with considerably more satisfactorily accurate and rapid results than has been achieved in any prior known technique, and is also advantageously capable of operating under vibration and moving conditions, such as the conditions present in an aircraft while it is in flight. Accordingly, it will be apparent in the following detailed description of the present invention that this technique mechanically departs from the prior known sextant type design and possesses unique aspects heretofore unknown to those skilled in the prior art so as to advantageously provide a sighting device having the foregoing ideal characteristics.

In accordance with one exemplary embodiment of the present invention two optical paths are provided; one which is a direct path for viewing the target and forming a target image, while the other is an indirect path for viewing the missile and forming a missile image.

In the direct path, light rays emanating from the target are passed through a multilayer dielectric film mirror which blocks out substantially all red light rays and passes substantially all other light rays in a direct line of sight to the observer. In the indirect path, light rays emanating from the missile (preferably an orange flare made up of red and yellow light attached to the missile) first pass through red filters, wherein substantially only the visual red light rays are passed, and then directly impinge upon a first surface coated reflecting mirror which reflects the visual red light rays toward the filter mirror, which in turn reflects the visual red light rays toward the observer. Limited rotation of the reflecting mirror about its axis advantageously causes the light rays emanating from the missile to be moved in one planar direction, whereas limited rotation of the filter mirror advantageously causes the light rays reflected from the reflecting mirror toward the filter mirror to move in a planar direction which is substantially perpendicular to the first planar direction. Accordingly, by selectively rotating either one or both of the mirrors a limited angle, the observer can universally move within the sighting device light rays emanating from the missile and thereby universally move the missile image until it is superimposed upon the image of the object as seen by the observer. As will be described in greater detail hereinafter, the limited angular movements of the mirrors may be utilized to develop signals proportional to the amount of angular deviation of the missile from its "on-target" course. Such signals may then be transmitted to the missile for inserting missile steering commands.

The optical section of this exemplary embodiment includes two movably mounted mirrors coupled to two magnetic actuators and two pick-off transducers, respectively. The mirrors are retained in a normal or un-energized position by supporting springs so that when the missile is optically aligned with the target the missile image in the indirect path is in superposition with the target image in the direct path. When the missile is not optically aligned with the target, the mirrors may be angularly moved, such as by coupling a control signal to the magnetic actuators, so that the missile image may be moved into superposition with the target image. That is to say, when the mirrors are angularly moved to cause image superposition, the light rays in the indirect path are moved through an angle which is substantially proportional to the angle between the line of sight to the target and the line of sight to the missile, using the observer's eye as the apex of the angle. It has been determined that the amount of angular mirror movement required to cause the missile image to be in superposition with the target image, when the missile and target are optically not aligned, will substantially equal one-half the angular movement of the light rays in the indirect path which is necessary to cause superposition of the missile and target images, and such angular movement of the light rays in the indirect path will be substantially proportional to the control signals coupled to the magnetic actuators of the system which moved the mirrors from their original position to the position required to cause superposition. As briefly stated above, missile steering command signals may be developed from the control signals utilized to selectively rotate the mirrors into a desired angular position wherein the target and missile images are in superposition. That is to say, the output signals of the present invention may be conventionally processed by a guidance system computer so as to develop steering command signals to be transmitted to the missile for causing the missile to follow a desired course from the observer to the target. One well known guidance computer is the type used for radar operated command guidance of missiles.

It should be noted that when the filtered light rays in the two optical paths are parallel, wherein the missile image is superimposed on the target image without optical compensation supplied by the actuators, the mirrors are in a null position. The null position is, therefore, that position in which the mirrors are held by the spring supports when no compensating or control signal is coupled to the magnetic actuators of the device and consequently when the present invention is in its null position no steering command signals would be developed and transmitted to the missile.

It is accordingly a primary object of the present invention to provide a sighting device for accurately and rapidly indicating the alignment of two visually observed remote objects utilizing electro-optical sighting means.

Another object of the present invention is to provide a sighting device for visually observing the course of a moving remote object towards a predetermined remote target and for developing an error signal indicative of the amount of deviation of the object from optical alignment with the target, which error signal may be utilized to develop and transmit steering command signals to the missile for varying the missile's course.

Another object of the present invention is to provide a device of the type described for proportionally determining the angle between two remote objects using the viewer's eye as the apex of the angle, which device utilizes electro-optical sighting means and displays two images, one sighted in a direct line of sight and the other sighted in the indirect line of sight and which device is substantially insensitive to relative movements of the device with respect to the target and missile.

It is another object of the present invention to provide a device of the type described for visually observing the relative positions of two remote objects wherein optical control of filtered light rays emanating from the remote objects causes the image of one object to be superposed upon the image of the other object so that the amount of angular movement within the device of the light rays emanating from one object which is necessary to cause superposition of the object images represents the angle between the line of sight to one object and the line of sight to other object using the viewer's eye as the apex of the angle.

Another object of the present invention is to provide a device of the type described for relatively positioning the images of two remote objects utilizing electro-optical sighting means, which device is capable of use when subjected to severe vibration and acceleration so as to be substantially insensitive to relative movement of the device with respect to the target and missile.

Another object of the present invention is to provide a device of the type described which is economical to manufacture and highly reliable in performing the intended functions and achieving the desired objects.

These and further objects and advantages of the present invention will become more apparent upon reference to the following description and claims and the appended drawings, wherein:

FIGURE 2 is an isometric view showing lines of sight to the target and missile and showing the angular deviation in both horizontal and vertical planes of the line of sight to the missile with respect to the line of sight to the target when the missile is not optically aligned with or in an intercept course to the target.

Figure 1:
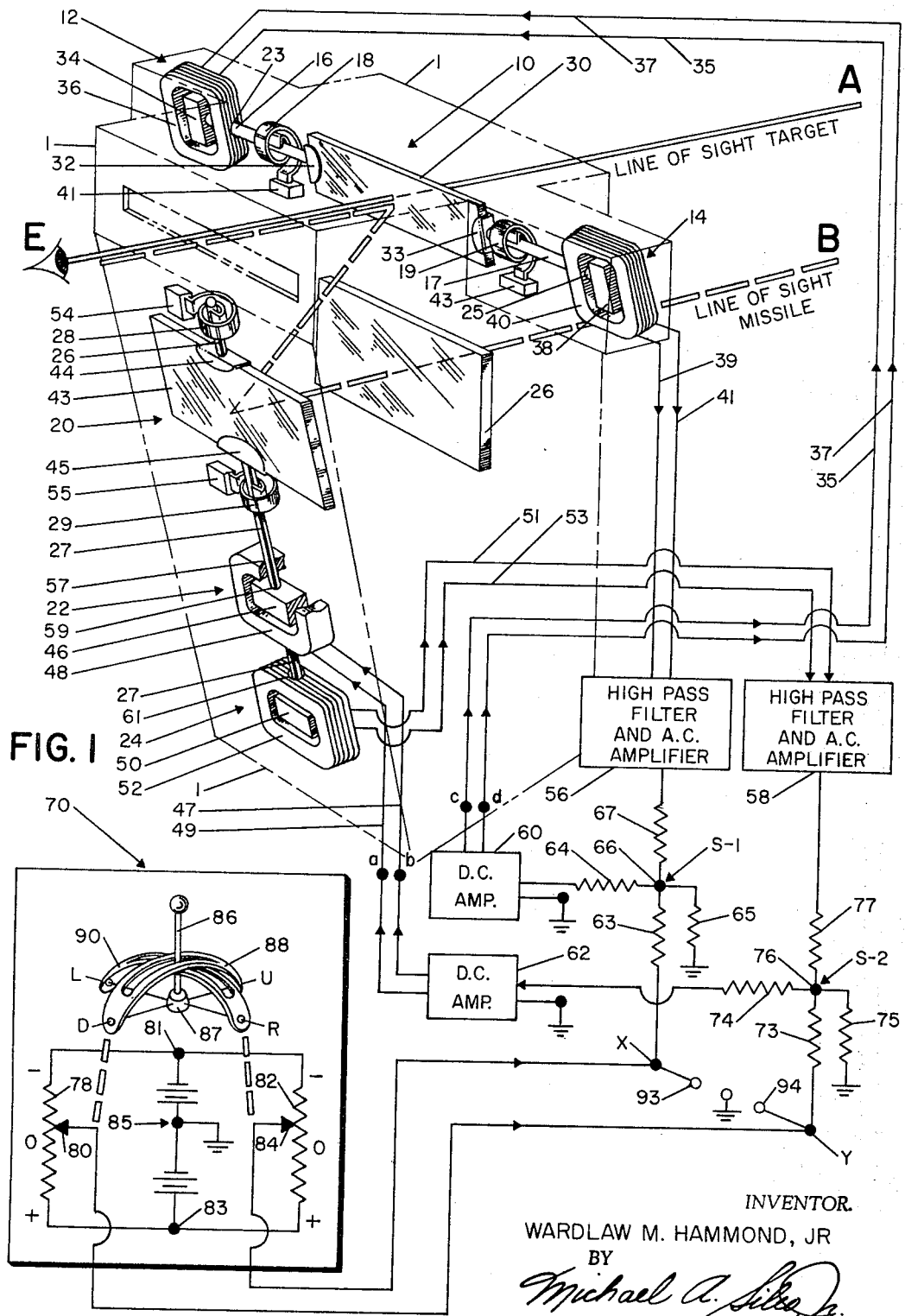
FIGURE 1 depicts an exemplary embodiment of the present invention comprising an isometric view of the optical section and control section, and includes a circuit of the command signal generator used in the control section, and a circuit of the filters and amplifiers utilized in processing signals generated by the control and optical sections of the device.

For exemplary purposes only, the following detailed description of FIGS. 1–2 and the mode of operation thereof sets forth a use of the sighting device of the present invention in a high speed missile launching aircraft with the target being substantially stationary. It is to be understood, however, that the novel sighting device of the present invention may be advantageously utilized in other missile launching moving vehicles as well as in a stationary launching site. Also, the target may be a stationary ground installation as well as a moving aircraft or missile without departing from the spirit and scope of the present invention.

*Detailed description—FIGURE 1*

Referring to the upper portion of FIG. 1, there is shown an isometric view of the optical section of the present invention which contains inter alia, two spring supported mirror sections for viewing in separate lines of sight a remote target and a moving missile. Each spring supported mirror section, generally indicated at 10 and 20, respectively, comprises a magnetic actuator section, generally indicated at 12 and 22, a signal pickoff transducer section, generally indicated at 14 and 24, mounting rods, 16–17 and 26–27, and spring supports, 18–19 and 28–29.

The mirror section 10 includes a multilayer dielectric film mirror 30 which has its ends respectively connected to the mounting rods 16 and 17 by friction gripping flange members 32 and 33, respectively. The multilayer dielectric film mirror 30 is of the type which reflects substantially all visual red frequency components of any light rays impinging upon its faces, and passes substantially all other visual frequency components of any light rays impinging upon the mirror 30. Thus, when a target is viewed through the mirror 30, the visual red frequency components reflected or emanating from the target toward the eye E of the observer will be reflected by the mirror 30, and only the remaining frequency components, such as blue and yellow, reflected or emanating from the target will be seen by the observer, such as in this case, the pilot of a missile launching aircraft.

The rod 16 of mirror section 10 passes through opening 23 of magnetic actuator coil 36 and has one of its ends rigidly connected to flange 32 and its other end rigidly connected to magnet 34; whereas rod 17 of mirror section 10 extends through opening 25 of pick-off transducer coil 40 and has one of its ends rigidly connected to flange 33 and its other end rigidly connected to magnet 38. The magnetic actuator coil 36 and transducer coil 40 are rigidly connected to housing 1 in any conventional manner so as to prevent relative movement between the coils 36 and 40 respectively with actuator magnet 34 and transducer magnet 38. The mirror section 10 is mounted to the housing 1 by spring supports 18 and 19 which are respectively connected to rods 16 and 17. The springs 18 and 19 may be adjustably connected to the rods 16 and 17 by friction or any other well known connecting means, such as set screws, nuts and bolts, welding, etc. The springs 18 and 19 are directly connected to housing 1 via mounting bases 41 and 42, respectively, which may be adjustably connected to the housing 1, e.g., set screws, nuts and bolts, welding, etc. It will be apparent, therefore, that mirror section 10 is generally movable about a substantially horizontal axis.

The mirror section 20 includes a first surface coated mirror 43, which has its ends respectively connected to the mounting rods 26 and 27 by friction gripping flange members 44 and 45, respectively. The first surface coated mirror 43 reflects substantially all light rays impinging upon mirror 43 toward the rear face of mirror 30 which in turn reflects the light rays toward the eye E of the observer.

Mounting rod 27 of mirror section 20 passes through opening 57 of magnetic actuator coil 48, opening 59 of magnetic actuator magnet 46, a second opening (not shown) in magnetic actuator coil 48, opening 61 of pickoff transducer coil 52, and is then rigidly connected to pickoff transducer magnet 50. The actuator coil 48 and transducer coil 52 are each rigidly connected to housing 1 so as to prevent relative movement respectively with actuator magnet 46 and transducer magnet 50. The magnets 46 and 50 are rigidly connected to rod 27 so that any angular movement of rod 27 causes a corresponding angular movement of magnets 46 and 50. The rods 26 and 27 are respectively connected to spring supports 28 and 29 which are rigidly connected to the housing 1 via mounting bases 54 and 55, respectively. The spring supports 28 and 29 may be adjustably connected to rods 26 and 27, respectively, by any well known connecting means, such as friction, welding, set screws, etc.; likewise, the mounting bases 54 and 55 may be adjustably connected to the housing 1. It will be apparent, therefore, that mirror section 20 is generally moveable about a substantially vertical axis.

It is important to note that the axes of mirror sections 10 and 20 are relatively positioned in adjacent offset relationship and are generally orthogonally disposed. This orthogonal positioning of mirror sections 10 and 20 advantageously render the sighting device insensitive to relative movements of the sighting device with respect to the observer and the lines of sight to the target. That is to say, when the sighting device is moved or vibrated and consequently mirror section 10 and 20 move transverse to their axis or pivot about their axis, light rays impinging on mirror 43 will be reflected in a path displaced from the light ray deflection before such movement or vibration so as to cause the missile image to move as viewed by the observer. The light rays are then reflected by mirror 43 toward the rear surface of mirror 30 and are reflected toward the eye E of the observer in a path also displaced from the light ray deflection before such movement or vibration. However, the unique orthogonal positioning of the mirror sections 10 and 20 uniquely result in the angular displacement of the light rays caused by such mirror 43 to be equal and opposite to the angular displacement of the light rays caused by such movement or vibration of mirror 30. Thus, the net result of light ray displacement caused by movements or vibrations of the present sighting device is substantially zero thereby rendering the present device substantially insensitive to movements relative to the observer or line of sight to the target and advantageously allowing use of the device in moving vehicles or in high vibration environments.

Positioned transverse to the indirect line of sight B and between the mirror 43 and the missile is a red filter 26 whose purpose is to pass only visual red frequency components reflected or emanating from the missile and reflect substantially all other frequency components of any visual light rays reflected or emanating from the missile or target. It is therefore highly desirable that the missile emit light of predominately visual red frequency components with respect to the quantity of visual red frequency components in the light emanating from the target. This is desirable so that the image developed in the indirect path is substantially that of the missile by virtue of the filtering characteristics of filter 26, and the reflecting characteristics of mirrors 30 and 43. Also, by virtue of the red light reflecting characteristics of the filter 30 of mirror section 10, the image developed in the direct path will be substantially that of the target since the predominant visual red light of the missile will be excluded by reflection. A preferred technique for concentrating the quantity of visual red frequency components in the light rays emanating from the missile is to attach an orange missile flare to the tail end of the missile which would be ignited just prior to or at the time of launching of the missile. The specific technique for providing a missile flare capable of emanating light rays having a high concentration of red frequency components does not constitute any portion of this invention and it is clearly within the knowledge of those skilled in the missile and aerospace arts to provide an accurate and reliable missile flare of the type suggested.

It should be noted at this point that the filter 26 may be removed from the device and a multilayer dielectric film mirror similar in all respects to mirror 30 may be substituted for the first surface coated mirror 43 without departing from the spirit and scope of the present invention. The prime purpose of filter 26 is to reflect all visual light other than visual red. Thus, any known filtration or reflection technique for passing and reflecting only visual red light in the indirect path is contemplated.

It is important to further note at this point that a low intensity target image may be developed in the indirect path due to the possible presence of visual red light emanating or reflecting from some targets. Also, a low intensity missile image may also be developed in the direct path due to the possible presence of non-red light in the missile flare. The red image of the missile as seen in the indirect path can readily be distinguished by the observer from a red image of the target by its appearance which is flare-like, and by its characteristic movement, which is a pitch and yaw type motion. The non-red image of the missile as seen in the direct path can easily be distinguished by the observer from the non-red image of the target by its color, which is primarily yellow in the case where an orange flare is used in the missile, and by its movement, which is not controllable by the mirrors in the optical section of the present invention. The non-red missile image will be superimposed on the red and controllable missile image when the mirrors are in their null position and likewise when the missile is in optical alignment with the target. The foregoing superposition of the red and non-red missile images occurs only when the optical elements of the sighting device are accurately calibrated. The existence of a double image condition due to an out-of-calibration of the present sighting device may be advantageously utilized. That is to say, it provides a visual indication of the out-of-calibration condition to the observer who can visually detect the inaccuracy of the device and compensate for errors it might introduce toward the end of the missile's flight. By way of example, if the observer superimposes the red missile image upon the non-red target image and he visually observes a substantially non-red missile image continuously appearing above and in non-alignment with the target even after time for missile flight path correction has passed he can rapidly realize that the missile will overshoot or pass over the target. This is so because the non-red missile image is developed in the direct path and represents the true missile image or direct line of sight to the missile. At this point the observer can correct for the out-of-calibration condition by introducing a compensating movement of the red missile image so that it will be placed on the other side of the non-red target image by an amount equal to the observed error. The observer is in effect aiming at an imaginary non-red target image offset from the real non-red target image by an amount equivalent to the calibration inaccuracy so that the missile will receive correcting missile steering commands and intercept the real target. Similar visual determinations can be rapidly made by the observer with respect to situations in which a non-red missile image exists below, to the left or to the right of the non-red target image. In all situations the observer disregards any red target image he may chance to observe.

It is also important to note at this point in the description that the spring supports 18 and 19 of the mirror section 10 and spring supports 28 and 29 of the mirror section 20 hold the mirrors in relative positions so that when the missile is optically aligned with the target, light rays emanating or reflected by the target and filtered by mirror 30 in the direct path will be in parallelism with light rays emanating or reflected by the missile, filtered by filter 26, and reflected by mirrors 43 and 30 in the indirect path towards the observer, and will therefore coincide at the eye E. This latter condition will be hereinafter referred to as the null position of the optical section of the present invention. It will be further apparent that since the mirror 30 in the direct path reflects substantially all visual red frequency components emanating from the target, and since filter 26 in the indirect path passes substantially only visual red frequency components emanating from the missile, the image of the missile will appear red, while the image of the target will be non-red, and the images will be in superposition when the optic section is in its null position.

Although a detailed description of the mode of operation of the optical section of the present invention follows below, it is important to now note that any angular movement of mirror 30 will cause the red image of the missile to move up or down, due to the change in the angular position of the rear face of mirrors 30 but will have no effect upon the non-red target image, and that any angular movement of the mirror 43 will cause the red image of the missile to move to the left or right, due to the change in the angular position of the front face of the mirror 43, but will have no effect upon the non-red target image, such movements being relative to the non-red image of the target as viewed in the direct path. Further, when the optical section is in its null position and the missile is in optical alignment with the target, the red image of the missile as it appears to the observer will be superimposed upon the non-red image of the target. Accordingly, when the missile is not in optical alignment with the target, finite angular movements of either mirror sections 10 or 20 or both out of their null position will cause the filtered light rays, i.e. light rays from the missile after passing through filter 26 and being reflected by mirrors 30 and 43, and light rays from the target after passing through mirror 30, to be moved into parallelism so that the red image of the missile will be superimposed upon the non-red image of the target as viewed by the observer. Uniquely, the quantity of angular movement of the mirror sections 10 and 20 which is necessary to create image superposition, is proportional to the angle in which the missile is out of optical alignment with the target. That is to say, the angle between the line of sight to the target and the line of sight to the missile, using the Eye E as the apex, represents the amount both horizontally and vertically in which the missile is out of alignment with the target or "off target." Accordingly, it is merely necessary to now insert into the optical section of the present invention a control signal which will cause the mirrors to independently rotate to an angular position in which the filtered light rays from the target and missile as viewed by the observer are in parallelism so that the missile and target images are in superposition. This control signal, as briefly mentioned above, may be advantageously utilized to develop steering command signals for transmission to the missile for altering its course to an "on-target" course or in optical alignment with the target.

One form of developing or generating a control signal to control angular movement of the optical sections 10 and 20 is depicted in FIG. 1, i.e., command signal control 70. Although command signal control 70 shown in detail in the lower left hand portion of FIG. 1 is mechanically operated by the observer, it is to be understood that any well known signal generator capable of developing signals proportionally representative of the movement necessary to independently rotate the mirror sections 10 and 20 so as to create missile and target image superposition may be incorporated without departing from the spirit and scope of the present invention.

Referring now to the lower lefthand section of FIG. 1, there is shown an exemplary embodiment of a command signal control, generally indicated at 70, which comprises a control stick 86 pivotally connected at 87, two arcuate members 88 and 90 each having a center slot through which control stick 86 extends, and a balance bridge comprising two potentiometers 78 and 82, with each resistor having their ends respectively connected to the negative and positive terminals 81 and 83 of a center tapped DC source of potential 85. The balanced bridge also includes variable taps 80 and 84, which are respectively connected to the arcuate members 88 and 90. Although a description of the operation of the command signal control 70 in conjunction with the magnetic actuators 12 and 24 is set forth below in detail, it will suffice to now state, however, that movement of control stick 86 causes a corresponding movement of variable taps 80 and 84 which consequently unbalances the balanced bridge. Thus, when the bridge is unbalanced a varying DC signal appears at both terminals X and Y. These signals represent the magnitude and direction of the movement of control stick 86.

Referring now to the lower righthand portion of FIG. 1, the varying potentials appearing at terminals X and Y are respectively delivered to DC Amplifiers 60 and 62 via resistors 63–64 and 73–74, respectively. The resistors 63–64 and 73–74 are part of the Summation Networks S1 and S2, respectively. An amplified version of the varying DC signals applied to the DC Amplifiers 60 and 62 are respectively delivered to coil 36 of magnetic actuator 12 and coil 48 if magnetic actuator 22 to case the magnets 34 and 46 to respectively rotate an angle essentially proportional to the amplitude of the varying potentials and in a direction dependent upon the polarity of the varying potentials.

Referring now to the middle right-hand portion of FIG. 1, High Pass Filters and AC Amplifiers 56 and 58, respectively receive any AC voltages induced in coils 40 and 52 of signal pickoff transducers 14 and 24. The High Pass Filters and AC Amplifiers 56 and 58 pass and amplify only high frequency components induced in coils 40 and 52, respectively, and deliver an amplified and out of phase version of the high frequency components to DC Amplifiers 60 and 62, respectively, via resistors 64–67 and 74–77, respectively. The Summation Networks S1 and S2 also include resistors 65 and 75, which are respectively coupled between summation terminals 66 and 76 and ground. It will be apparent that the signals coupled to DC Amplifiers 60 and 62 represent the algebraic summation of the varying DC signals generated by Command Signal Control 70, which are delivered to the Summation Networks S1 and S2 via terminals X and Y, respectively, and the inverse phase of any high frequency AC signals developed by the High Pass filters and AC Amplifiers 56 and 58, respectively, which are delivered to the Summation Networks S1 and S2, respectively, via resistors 67 and 77, respectively. The resistors 64 and 74 of Summation Networks S1 and S2 merely exemplify the resistance necessary for impedance matching between DC Amplifiers 60 and 62 and the balance bridge network of the Command Signal Control 70.

Although a description of the operation of the signal pick-off transducers 14 and 24 in conjunction with the High Pass Filters and AC Amplifiers 56 and 58 is set forth below in detail, it will suffice to now state that the transducers 14 and 24 are primarily included to prevent undesirable oscillation of the mirror sections 10 and 20 due to rapidly inserted control signals or excessive vibration of the sighting device. That is to say, if the control stick 86 were to be rapidly moved from its central position, a varying DC signal having a high rate of charge would be developed by control signal generator 70 and coupled to actuators 12 and 22. Depending upon the mechanical resonance of the spring supported mirror sections 10 and 20, certain rapidly changing DC signals would cause mirror oscillation. This mirror oscillation is highly undesirable and effective damping means is manifest. The transducers provide such effective damping means by virtue of a negative feedback loop which electromagnetically develops AC signals proportional to any angular movements of magnets 38 and 50. Briefly, when such AC signals have a frequency exceeding a predetermined value the High Pass Filters and AC amplifiers 56 and 58 will pass and amplify such high frequency AC signals and couple them to the Summation Networks S1 and S2 where they are algebraically summed with the varying DC signals developed by Control Signal Generator 70. The net effect of this feedback loop is to counteract the effect of undesirable varying DC signals coupled to the actuators 12 and 22 but yet prevent negative feedback action when desirable varying DC signals are coupled to the actuators 12 and 22. The foregoing negative feedback action is also effective when the spring supported mirror sections 10 and 20 oscillate due to externally applied vibration.

Although a computer for processing the control signals developed by the Control Signal Generator 70 does not constitute a portion of the present invention, output terminals 93 and 94 are depicted. The terminals 93 and 94 are shown directly connected to terminals X and Y and the output signals taken therefrom are bi-polar as exemplified by the ground terminal between terminals 93 and 94. Briefly, it will be apparent that the electro-optical processing of the varying DC signals developed by the Control Signal Generator 70 in the present invention merely enables the observer to visually observe the missile and target images, and when the images are not in superposition, i.e. the target and missile are not optically aligned so that the filtered light rays in the direct and indirect paths are not parallel, the observer can cause image superposition and thereby develop the varying DC signals. The varying DC signals present at terminals X and Y and consequently present at output terminals 93 and 94 may then be conventionally processed by the logic section of a standard computer and converted into guidance or steering command signals to be transmitted to the missile so as to modify the course of the missile in both azimuth and elevation. It will be apparent that the computer can be programmed to account for any overshoot in the missile's course to the target by the operator's movement of the control stick 86. By way of example, the computer may transmit steering command signals to the missile which merely indicate a new course and can simultaneously compute the period in which the missile must hold the new course in order to be in direct optical alignment with the line of sight from the observer to the target. At the expiration of this computed time, the missile would receive additional steering command signals from the computer for returning the missile or placing it in a dynamically changing course which would result in the missile slowly moving into optical alignment with the line of sight from the observer to the target. It is to be understood, however, that the computation and utilization of the varying DC signals generated by the Command Signal Control 70 forms no part of the present invention and any specific computation and utilization of the DC signals may be incorporated without departing from the spirit and scope of the present invention.

*Detailed description—FIGURE 2*

FIGURE 2 depicts an isometric view of the lines of sight from the eye of the observer 100 to the target 102 and missile 104. For purposes of clarity and simplicity of explanation the sighting device 108 of the present invention is shown elevated from the horizon 106. Additionally, the missile 104 is shown in flight toward the remote target 102, which is graphically shown as a tank. It is to be understood, of course, that the unique features of the present invention are equally applicable when the sighting device 108 is at ground level and the target is either as shown or elevated. The prime requirement in the operation of the device is that both the missile 104 and target 102 must be within the field of view of the sighting device 108.

When the missile 104 is not in optical alignment with the target 102, the line of sight 112 to the missile 104 will be askew to the line of sight 110 to the target 102, i.e. not parallel in either a horizontal or a vertical plane. That is to say, an angle will exist between the line of sight 112 and the line of sight 110. It is, therefore, manifest that this angle be determined so that command signals may be transmitted to the missile 104 proportional to this angle so as to bring the missile 104 to an "on-target" course. It is to be understood that the angle between the lines of sight 110 and 112 merely represents the angular deviation of the missile from an "on-target" course using the observer's eye 100 as the apex of the angle and the target and missile lines of sight 110 and 112 as the sides of the angle. It will be apparent, therefore, that this angular deviation must be analyzed so as to develop error signals representing azimuth and elevation guidance commands for the missile.

The present invention provides a unique technique for processing light rays emanating from both the target 102 and missile 104 so that images of the target 102 and missile 104, when viewed by the eye 100, may be utilized to develop signals which are proportional to the angular deviation of the missile 104 from an "on-target" course. A detailed description of the unique optical device 108 for processing these light rays has been set forth above but it will suffice to here state that when the missile is not optically aligned with the target the sighting device 108 develops missile and target images which are not in superposition, and enables the observer to actually move the image of the missile in both horizontal and vertical directions so as to cause the missile image to be superimposed upon the target image. The present invention is capable of sensing the amount of movement necessary to bring about such image superposition and to convert such movements into electrical signals indicative of the horizontal and vertical angular deviation of the missile's course from an "on-target" course. It will be apparent, therefore, that such electrical signals may be utilized to develop guidance command signal for transmission to the missile.

Referring again to FIG. 2, the plane ABCD represents a vertical plane passing through the line of sight 112 whereas plane ABEF represents a vertical plane passing through the line of sight 110. The angle $\alpha H$ represents the horizontal angle between plane ABCD and plane ABEF and consequently the vertical angle between lines of sight 110 and 112. Thus, the missile 104 is horizontally out of optical alignment with the target 102 by the angle $\alpha H$ when viewed from the eye 100.

In FIG. 2, the lines AC and AE have been drawn in the same horizontal plane so that line AE represents the line of interception between a horizontal plane containing the line of sight 112 and the vertical plane ABEF. Thus, the angle $\alpha V$ represents the vertical angle between line of sight 110 and line of intercept AE and consequently the vertical angle between the lines of sight 110 and 112. It will be recalled from the above detailed description of FIG. 1 that the angular movement of mirror section 43 necessary to horizontally align the missile and target images when the missile is out of optical alignment with the target, proportionally represents the horizontal angular deviation of the missile's course from an "on-target" course; whereas, the angular movement of mirror section 30 necessary to vertically align the missile and target images when the missile is out of optical alignment with the target, proportionally represents the vertical angular deviation of the missile's course from an "on-target" course. Accordingly, the varying DC signals developed by the Control Signal Generator 70 are uniquely proportional to the angles $\alpha V$ and $\alpha H$.

It will thus be apparent that FIG. 2 has been included herein to merely assist in the complete understanding of the horizontal and vertical angular deviations of the missile's course from an "on-target" course, which deviations are uniquely developed by the sighting device of the present invention. Thus, in view of FIGS. 1 and 2, the present invention advantageously enables the observer to visually observe the relative positions of the missile and target and by manual manipulations develop signals proportionally indicative of the vertical and horizontal angular deviations of the missile's course from an "on-target" course.

*Mode of operation—FIGS. 1–2*

A mode of operation of the present invention as exemplified in FIGS. 1 and 2 is as follows:

Referring first to the optical section of the present invention, when there are no signals present on terminals $a-b$ or $c-d$, and the missile is optically aligned with the target, the spring supported mirror sections 10 and 20 are held in their null position by springs 18–19 and 28–29, respectively, so that the rays of light in the direct path B are first reflected off reflecting mirror 43 and then reflected off the rear face of filter mirror 30 in both horizontal and vertical parallel relationship with the rays of light in the direct path A so that the missile and target images are superimposed as viewed by an observer.

When there are no input signals present on terminals $a-b$ or $c-d$, and the missile is not in optical alignment with the target and the spring supported mirror sections 10 and 20 are in their null positions, the rays of light developed in the indirect path B are not parallel in either a horizontal or vertical direction to the rays of light developed in the direct path A so that the missile and target images are not superimposed as viewed by an observer.

In the latter condition, a command signal is then applied to terminals $a-b$ thereby causing current to flow in actuator coil 48 which applies an electromagnetic torque to actuator magnet 46 which in turn causes shaft 27 to rotate and accordingly mirror 43 to rotate. The rotation of mirror 43 is essentially proportional to the command signal applied to terminals $a-b$. Accordingly, by predetermined selection of the command signal applied to terminals $a-b$, the mirror 43 may be caused to rotate through an angle sufficient to cause the filtered light rays in the indirect path B to be parallel with the filtered light rays in the direct path A in a horizontal direction only.

A command signal is then simultaneously applied to the terminals $c-d$ thereby causing current to flow in actuator coil 36 which applies a magnetic torque to actuator magnet 34 which in turn causes shaft 16 to rotate and accordingly mirror 30 to rotate. The rotation of mirror 30 is essentially proportional to the command signal applied to terminals $c-d$. By predetermined selection of the command signal applied to terminals $c-d$, the mirror 30 may be caused to rotate through an angle sufficient to cause the filtered light rays in the indirect path B to be parallel with the filtered light rays in the direct path A in the vertical direction only.

It will be apparent, that the deliberate movement of the rays of light in the indirect path B into parallelism with the rays of light in the direct path A in both vertical and horizontal directions will cause coincidence of the filtered rays of light, and, therefore, the images developed in each path will be in superposition as viewed by an observer. The command signals applied to terminals $a-b$ or $c-d$ or both which are necessary to cause both horizontal and vertical parallelism of the filtered light rays in the direct and indirect paths, proportionally represent the vertical and horizontal angles between the line of sight 110 to the target 102 and the line of sight 112 to the missile 104 (see FIG. 2, angles αH and αV). If no signals are applied to terminals a–b or c–d and the mirrors are in their null positions, and if the images are in superposition, then the vertical and horizontal angles between the line of sight 110 to the target 102 and the line of sight 112 to the missile 104 will be zero.

As mentioned above in the detailed description of FIG. 1, the specific command signal control 70 may be any well known signal generator capable of developing signals representative of the movement necessary to rotate the mirror sections 10 and 20 so as to cause target and missile superposition.

Referring now to the exemplary command signal control 70, when control stick 86 is moved in the directions L or R arcuate member 88 experiences a corresponding movement which in turn causes the variable tap 80 of the balance bridge to move toward one or the other end of resistor 78. In the position shown variable tap 80 is tapping off a zero potential. Any movement of slider 80 out of this position, which is its null position, will unbalance the bridge and cause a DC signal to appear at terminal Y. The polarity of the signal delivered to terminal Y will depend upon the direction of movement of variable tap 80, i.e., movement upwardly as shown on the drawing will cause a negative potential to appear at terminal Y while movement downwardly will cause a positive potential to appear at terminal Y; whereas the amplitude of the signal delivered to terminal Y will depend upon the amount of movement of variable tap 80 out of its null position.

Movement of control stick 86 in the U or D direction causes arcuate member 90 to correspondingly move, which in turn causes variable tap 84 of the balanced bridge to correspondingly move. As mentioned above with regard to variable tap 80, variable tap 84 is also in its null position or at a zero potential point on resistor 82 of the balanced bridge. Thus, when variable tap 84 is moved up or down, as shown in FIG. 1, a negative or positive DC signal will be delivered to terminal X, the polarity of which will depend upon the direction of movement of slider 84; whereas the amplitude of the signal will depend upon the amount of movement of variable tap 84 out of its null position. Accordingly, the polarity and voltage of the signals delivered to terminals X and Y are directly proportional to the movement of variable taps 80 and 84, respectively, which in turn are directly proportional to the movement of arcuate members 88 and 90, respectively, which in turn are directly proportional to the movement of control stick 86. Thus, the polarity and voltage of the signals delivered to terminals X and Y are proportional to the movement of control stick 86, and such signals can be readily utilized to electro-magnetically control the movement of mirror sections 10 and 20.

It will be apparent therefore that any movements of control stick 86 in any direction will cause a corresponding movement of arcuate members 88 or 90 or both, which in turn will cause corresponding movements of variable taps 80 and 84 and thus, result in the application of varying DC signals to terminals X and Y, which signals will be proportional to the universal movement of control stick 86.

The signals present at terminals X and Y are then simultaneously coupled to summation networks S1 and S2, respectively, via resistors 63 and 73, respectively. It is important to note at this point that any signals respectively coupled to Summation Networks S1 and S2 via High Pass Filter and AC Amplifiers 56 and 58 are algebraically added to the signals respectively coupled to Summation Networks S1 and S2 via terminals X and Y, and the resulting summation signals are then respectively delivered to DC Amplifiers 60 and 62.

For purposes of simplicity of explanation, we will assume that only command signals from control 70 are coupled to Summation Networks S1 and S2. The signals respectively present at summation terminals 66 and 76 of Summation Networks S1 and S2 are coupled to DC Amplifiers 60 and 62, respectively, where they are respectively amplified and coupled to magnetic actuator coils 36 and 48 via terminals a–b and c–d, respectively. The amplitude and polarity of the amplified command signals determines the magnitude and direction of the electro-magnetic flux field about the actuator coils 36 and 48. These flux fields independently cause actuator magnets 34 and 46 to rotate out of their null position in magnitude proportional to the magnitude of their corresponding flux field and in a direction depending upon the direction of their corresponding flux field. Since actuator magnets 34 and 46 are rigidly connected to rods 16 and 27, respectively, mirrors 30 and 43 correspondingly rotate into angular positions which cause the visual red light rays in the direct path to be parallel to the visual non-red light rays in the direct path. Accordingly, the observer will visually see the red missile image superimposed on the non-red target image notwithstanding the fact that the missile is not optically aligned with the target. As mentioned above, the amount of angular movement of mirror sections 10 and 20 out of their null positions is proportional to the angular deviation of the missile's course from an "on-target" condition, i.e., the amount of optical non-alignment of the missile regarding the target.

Since the mirrors 30 and 43 are suspended solely by springs 18–19 and 28–29, respectively, rapid angular movements of the shafts 16 and 27 introduced by command signals or mechanical vibrations may undesirably cause mirror oscillation at a frequency depending upon the mechanical resonance of the suspended mirror sections 10 and 20. Since the device may be operated in a vibrational environment and since it may be difficult to prevent the application of rapid command signals to the device, damping means may be desirable. In order to provide this desirable damping, signal pick-off transducers 14 and 24 in conjunction with magnetic actuators 12 and 22, respectively, and High Pass Filters and AC Amplifiers 56 and 58, respectively, are utilized in a negative feedback loop. The High Pass Filters advantageously allow feedback action at the frequency of natural resonance of the suspended mirror sections yet prevent feedback action at the lower frequencies associated with typical input command signals. When shafts 16 or 27 are angularly rotated as a result of external mechanical vibration or by command signals, magnets 38 and 50, which are connected to shafts 17 and 27, respectively, are caused to rotate within the transducer coils 40 and 52, respectively, thereby inducing an AC voltage in the coils 40 and 52 proportional to the rate of change of this movement and with a polarity determined by the direction of the movement. This signal is filtered and amplified by the High Pass Filters and AC Amplifiers 56 and 58, respectively, and if the frequency of this signal is above a predetermined value, it is applied to the summation networks S1 and S2, respectively. This damping signal is then applied to the DC amplifiers 60 and 62, respectively, which in turn couples a proportional version of the damping signal to the actuator coils 36 and 48. The damping signals applied to the actuator coils 36 and 48 are of opposite polarity to the signals induced in pick-off transducer coils 40 and 52 due to rotation of transducer magnets 38 and 50 when external mechanical vibration or command signals are applied to the system.

It will be apparent, therefore, that any undesirable rapid or irregular angular movements of the spring supported mirror sections 10 and 20 will develop high frequency signals into the transducer coils 40 and 52 by mechanically exciting the suspended mirror sections into resonance which in turn will be processed by High Pass Filters and AC amplifiers 56 and 58 and fed back into the system so as to electro-mechanically oppose such undesirable angular movements. It should be noted at this point that any normal command signals developed by the control section 70 will not induce high frequency signals into the transducer coils 40 and 52 and consequently no damping signals will be developed since such normal command signals will merely induce low frequency signals into the transducer coils 40 and 52 which will be blocked by the High Pass Filters and AC amplifiers 56 and 58.

It will be apparent from the foregoing detailed description and mode of operation of the present invention that the unique optical processing and control of the light rays emanating from a moving object and predetermined target provides rapid and accurate development of a signal indicative of the amount of deviation of the object from optical alignment with the target. Further, the utilization of an optical section having a direct line of sight to the target and an indirect line of sight to the object in combination with magnetic actuators for causing the image of the object to be superimposed upon the image of the target as visually seen by the observer when the object and target are not optically aligned, uniquely develops an angular movement of the optical section which is proportional to the amount of deviation of the object from optical alignment with the target. Additionally, the use of magnetic pick-off means in operative association with the magnetic actuators of the device uniquely prevents undesirable oscillation of the device due to rapid command signals or excessive vibration of the device thereby providing desirable damping characteristics.

As discussed briefly above in the detailed description of FIG. 1, the mirror sections 10 and 20 are substantially insensitive to relative movements of the sighting device with respect to the observer, and the line of sight to the target by virtue of the orthogonal positioning of the axes of mirror sections 10 and 20 with respect to each other. That is to say, any angular movements of the sighting device relative to the observer and the target line of sight does not impair its function of accurately determining the angular deviation of the missile's course from an "on-target" course. This highly advantageous feature of the present invention is specifically achieved by virtue of the fact that the rays of light in the direct path which emanate from the target pass through mirror 30 and are essentially undeviated by this mirror regardless of its angular position and thus any angular movements of mirror 30 will not cause the target as viewed by the observer to appear to move. Although the rays of light emanating in the indirect path which emanate from the missile or missile flare are deviated by movements of mirrors 30 and 43, the amount of angular deviation of the light rays caused by the mirror 43 is equal but opposite to the amount of angular deviation of the light rays caused by the mirror 30. For example, a clockwise angular displacement of the sighting device relative to the observer and the line of sight to the target will angularly deviate the light rays impinging on mirror 43 in a clockwise direction by an angle substantially two times the angular displacement of the sighting device. The mirror 30 will then angularly deviate the light rays reflected from mirror 43 and impinging on the rear surface of mirror 30 in a counterclockwise direction by an angle substantially two times the angular displacement of the sighting device thus substantially compensating for such angular displacement. This advantageous characteristic of the present invention is highly important when the sighting device is employed in moving vehicles or vibrating environments.

Accordingly, the present invention uniquely provides a sighting device for use in a missile or weapon guidance system which is capable of rapid and accurate determination of the optical alignment of two remote objects; which directly produces rotating movement of the optical section; does not require the use of bearings; develops low friction loads upon the device; has high damping characteristics; develops high torque for its size, is light in weight; and has low tolerance requirements.

it is thus further seen that the sighting device of the present invention is simple in construction, economical to manufacture, and highly efficient in achieving the desired objects and performing the intended functions.

While merely a single embodiment of the present invention has been described in detail, it is to be understood that other modifications are contemplated which would be apparent to persons skilled in the art without departing from the spirit of the invention or the scope of the appended claims.

I claim:

1. A sighting device for visually observing the course of a moving remote object toward a predetermined remote target and for developing a signal indicative of the amount of deviation of said object from optical alignment with said target, said device comprising:
 (a) a movably mounted filter mirror pivotally mounted about an axis for viewing said target in a first line of sight, said filter mirror being adapted to pass light rays emanating from said target and to direct said light rays in a direct path toward an observer;
 (b) a movably mounted reflecting mirror pivotally mounted about an axis for viewing said object in a second line of sight, said reflecting mirror being adapted to reflect light rays emanating from said object and to direct said light rays toward said filter mirror, said reflecting mirror axis being substantially perpendicular to said filter mirror axis;
 (c) said filter mirror being further adapted to reflect the light rays reflected by said reflecting mirror toward said observer whereby said light rays from said object traverse an indirect path to said observer;
 (d) mounting means connected to said mirrors for holding said mirrors in a null position so that only when said object and target are optically aligned will said light rays in said indirect path be reflected by said mirrors in parallelism with said light rays in said direct path;
 (e) positioning means coupled to said mirrors for independently moving each of said mirrors out of said null position so that when said object is not optically aligned with said target, said light rays in said indirect path may be reflected by said mirrors in parallelism with said light rays in said direct path;
 (f) control means coupled to said positioning means for generating a signal which when applied to said positioning means causes said mirrors to independently move out of said null position into a position whereby said light rays in said indirect path are reflected by said mirrors in parallelism with said light rays in said direct path, and
 said signal generated by said control means being indicative of the amount of deviation of said object from optical alignment with said target, and
 (g) electro-magnetic detecting means coupled to said mirrors for detecting and preventing undesirable vibrations of said mirrors.

2. A sighting device in accordance with claim 1, wherein:
 (a) said filter mirror being further adapted to reflect visual red light only so that the light rays in said direct path are substantially visual non-red light rays; and
 (b) said reflecting mirror being further adapted to reflect visual red light only so that the light rays in said indirect path are substantially visual red light rays whereby said observer may visually differentiate said visual red light rays in said indirect path from said visual non-red light rays in said direct path.

3. A sighting device for visually observing the course of a moving remote object toward a predetermined remote target and for developing a signal proportional to the amount of deviation of said object from optical alignment with said target, said device comprising:

(a) a filter mirror pivotally mounted about a first axis for viewing said target in a first line of sight, said filter mirror being adapted to pass light rays emanating from said target and to direct said light rays in a direct path toward an observer;

(b) a reflecting mirror pivotally mounted about a second axis for viewing said object in a second line of sight, said reflecting mirror being adapted to reflect light rays emanating from said object and to direct said light rays toward said filter mirror, said reflecting mirror axis being subsequentially perpendicular to said filter mirror axis;

(c) said filter mirror being further adapted to reflect the light rays reflected by said reflecting mirror toward said observer whereby said light rays from said object traverse an indirect path to said observer;

(d) spring means connected to said mirrors for pivotally supporting each of said mirrors in a null position so that only when said object is optically aligned with said target will said light rays in said indirect path be reflected by said mirrors in vertical and horizontal parallelism with said light rays in said direct path;

(e) electro-magnetic positioning means coupled to said mirrors for developing an independent electro-magnetic torque upon each of said mirrors so as to cause said mirrors to independently pivot out of said null position so that when said object is not optically aligned with said target, said light rays in said indirect path may be reflected by said mirrors in vertical and horizontal parallelism with said light rays in said direct path;

(f) control means coupled to said positioning means for generating signals which when applied to said positioning means causes said mirrors to independently pivot out of said null position into a position whereby said light rays in said indirect path are reflected by said mirrors in vertical and horizontal parallelism with said light rays in said direct path, said signal generated by said control means being proportional to the amount of deviation of said object from optical alignment with said target, (g) electro-magnetic detecting means coupled to said mirrors for detecting undesirable vibrations of said mirrors; and (h) coupling means coupled to said detecting means and to said electro-magnetic positioning means for preventing undesirable vibrations of said mirrors.

4. A sighting device for visually observing the relative positions of two remote objects, comprising:

(a) a pair of mirror means each pivotally mounted about an axis for optically developing an image of each of said objects and for directing said images to the eye of an observer, the axis of each said mirror being substantially perpendicular to the axis of the other said mirror;

(b) mounting means connected to said mirror means for holding said mirror means in a reference position so that only when said objects are in predetermined relative positions will said images be in superposition;

(c) positioning means coupled to each said mirror means for moving said mirror means out of said reference position into a second position so that when said objects are not in said predetermined relative positions said images may be optically moved relative to each other into superpositions;

(d) detecting means for detecting undesirable vibrations of said mirror means; and (e) coupling means for coupling said detecting means to said positioning means so as to prevent the undesirable vibrations of said mirror means;

(f) said movement of said mirror means out of said reference position substantially representing the amount of deviation of said objects from said predetermined relative positions.

5. A sighting device for visually observing the relative positions of two remote objects, comprising:

(a) first mirror means pivotally mounted about an axis for optically developing an image of one of said objects and for directing said image to an observer;

(b) second mirror means pivotally mounted about an axis for optically developing an image of the other of said objects and for directing said second image to said observer, said second mirror means axis being substantially perpendicular to said first mirror means axis;

(c) mounting means connected to said first and second mirror means for holding each of said first and second mirror means in null positions so that only when said objects are in predetermined relative positions will said images of said objects be in superposition as viewed by said observer;

(d) positioning means coupled to said first and second mirror means for moving said first and second mirror means out of their null position so that when said objects are not in said predetermined relative positions, said images may be optically moved relative to each other into superposition;

(e) control means coupled to said positioning means for controlling said positioning means and consequently the amount of movement of each of said first and second mirror means out of said null positions; and (f) said movement of said first and second mirror means out of said null positions being proportional to the amount of deviation of said objects from said predetermined relative positions;

(g) detecting means coupled to said first and second mirror means for detecting undesirable movements of said first and second mirror means; and (h) coupling means coupled to said detecting means and said positioning means for preventing said undesirable movements of said first and second mirror means.

6. A sighting device for visually observing the relative positions of two remote objects in two independent lines of sight, comprising:

(a) first mirror means pivotally mounted about an axis for viewing one of said remote objects in a first line of sight, said mirror means being adapted to pass light rays emanating from said one object and to direct said light rays towards an observer;

(b) second mirror means pivotally mounted about an axis for viewing the other of said remote objects in a second line of sight, said second mirror means being adapted to reflect light rays emanating from said other object and to direct said light rays indirectly toward said observer, said second mirror means axis being substantially perpendicular to said first mirror means axis;

(c) mounting means connected to said first and second mirror means for holding said first and second mirror means in null positions so that only when said first and second lines of sight are parallel will said light rays from said other object be optically directed towards said observer in parallelism with said light rays from said one object;

(d) positioning means coupled to said first and second mirror means for moving said first and second mirror means out of their null positions so that when said first and second lines of sight are not parallel, said light rays from said other object may be optically directed towards said observer in parallelism with said light rays from said one object; and (e) said movement of said first and second mirror means out of said null positions substantially representing the amount of deviation of said lines of sight from parallelism;

(f) detecting means coupled to said first and second mirror means for detecting undesirable movements of said first and second mirror means; and (g) coupling means coupled to said detecting means and said positioning means for preventing said undesirable movements of said first and second mirror means out of said null positions.

References Cited

UNITED STATES PATENTS

| | | | |
|---|---|---|---|
| 2,752,684 | 7/1956 | Bentley et al. | 88—2.4 X |
| 2,887,927 | 5/1959 | Newton | 88—2.4 X |
| 2,971,437 | 2/1961 | Surtees | 89—1.7 |
| 2,994,245 | 8/1961 | Wagner | 88—2.4 |
| 3,026,615 | 3/1962 | Aubert | 81—1 |

JEWELL H. PEDERSEN, *Primary Examiner.*

BENJAMIN A. BORCHELT, V. R. PENDEGRASS, O. B. CHEW, *Examiners.*